United States Patent
Kim et al.

(10) Patent No.: US 11,075,419 B2
(45) Date of Patent: Jul. 27, 2021

(54) METHOD OF MANUFACTURING POUCH-SHAPED BATTERY CELL COMPRISING JIG GRADING

(71) Applicant: LG CHEM, LTD., Seoul (KR)

(72) Inventors: Eun Bee Kim, Daejeon (KR); Jung Pil Lee, Daejeon (KR); Hye Ri Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 111 days.

(21) Appl. No.: 16/486,689

(22) PCT Filed: Aug. 27, 2018

(86) PCT No.: PCT/KR2018/009852
§ 371 (c)(1),
(2) Date: Aug. 16, 2019

(87) PCT Pub. No.: WO2019/054666
PCT Pub. Date: Mar. 21, 2019

(65) Prior Publication Data
US 2019/0372062 A1 Dec. 5, 2019

(30) Foreign Application Priority Data
Sep. 18, 2017 (KR) .................. 10-2017-0119815

(51) Int. Cl.
*H01M 4/02* (2006.01)
*H01M 50/10* (2021.01)
(Continued)

(52) U.S. Cl.
CPC .......... *H01M 50/10* (2021.01); *H01M 4/485* (2013.01); *H01M 10/0404* (2013.01); *H01M 10/0525* (2013.01); *H01M 50/60* (2021.01)

(58) Field of Classification Search
CPC ...................................................... H01M 4/02
See application file for complete search history.

(56) References Cited

U.S. PATENT DOCUMENTS

| 9,620,809 B2 | 4/2017 | Turon Teixidor et al. |
| 2014/0072868 A1* | 3/2014 | Lev ........ H01M 10/18 429/210 |

(Continued)

FOREIGN PATENT DOCUMENTS

| JP | 2001-297798 A | 10/2001 |
| JP | 2001-313067 A | 11/2001 |

(Continued)

OTHER PUBLICATIONS

International Search Report issued in PCT/KR2018/009852 (PCT/ISA/210), dated Dec. 11, 2018.

(Continued)

*Primary Examiner* — Jacob B Marks
(74) *Attorney, Agent, or Firm* — Birch, Stewart, Kolasch & Birch LLP (57) ABSTRACT

A method of manufacturing a pouch-shaped battery cell including a silicon-based negative electrode active material includes injecting an electrolytic solution into a pouch-shaped battery case, in which an electrode assembly is mounted, charging and discharging the pouch-shaped battery cell having the electrolytic solution injected thereinto (a primary formation step), placing the pouch-shaped battery cell in a jig configured to fix and press the pouch-shaped battery cell, and charging and discharging the pouch-shaped battery cell while pressure is applied to the pouch-shaped battery cell by the jig (a jig grading step).

10 Claims, 2 Drawing Sheets

(51) Int. Cl.
    *H01M 4/485*     (2010.01)
    *H01M 10/04*     (2006.01)
    *H01M 10/0525*     (2010.01)
    *H01M 50/60*     (2021.01)

(56)     References Cited

U.S. PATENT DOCUMENTS

| | | |
|---|---|---|
| 2014/0266066 A1 | 9/2014 | Turon Teixidor et al. |
| 2016/0133926 A1* | 5/2016 | Lee ................ H01M 4/133 429/224 |
| 2016/0172727 A1* | 6/2016 | Chan ................ H01M 50/20 429/120 |
| 2016/0293922 A1* | 10/2016 | Umeyama ......... H01M 10/0585 |
| 2016/0293944 A1* | 10/2016 | Yoon ................ H01M 4/134 |
| 2017/0125787 A1 | 5/2017 | Ryu et al. |
| 2017/0170510 A1 | 6/2017 | Turon Teixidor et al. |

FOREIGN PATENT DOCUMENTS

| | | |
|---|---|---|
| JP | 2014-35987 A | 2/2014 |
| JP | 2016-81790 A | 5/2016 |
| JP | 2016-515291 A | 5/2016 |
| KR | 10-0987942 B1 | 10/2010 |
| KR | 2015-0015303 A | 2/2015 |
| KR | 2015-0082957 A | 7/2015 |
| KR | 10-2016-0132572 A | 11/2016 |
| KR | 10-2017-0019614 A | 2/2017 |
| KR | 10-2017-0021213 A | 2/2017 |
| KR | 10-2017-0033601 A | 3/2017 |
| KR | 10-2017-0034774 A | 3/2017 |
| KR | 10-2017-0050547 A | 5/2017 |

OTHER PUBLICATIONS

Supplementary European Search Report issued in EP application No. 18857023.8 dated Dec. 17, 2019.

* cited by examiner

<EXAMPLE 1>

<COMPARATIVE EXAMPLE 1>

METHOD OF MANUFACTURING POUCH-SHAPED BATTERY CELL COMPRISING JIG GRADING

TECHNICAL FIELD

This application claims the benefit of Korean Patent Application No. 2017-0119815 filed on Sep. 18, 2017 with the Korean Intellectual Property Office, the disclosure of which is herein incorporated by reference in its entirety.

The present invention relates to a method of manufacturing a pouch-shaped battery cell including jig grading, and more particularly to a method of manufacturing a pouch-shaped battery cell including a process of fixing the pouch-shaped battery cell using a jig and a process of performing jig grading in the state in which pressure is applied to the jig.

BACKGROUND ART

As the demand for mobile devices has increased, the demand for secondary batteries as energy sources for the mobile devices has also sharply increased. Lithium secondary batteries may be classified into a cylindrical battery, a prismatic battery, and a pouch-shaped battery based on the shape of a battery case. Each of the cylindrical battery and the prismatic battery is a battery that is configured to have a structure in which an electrode assembly is mounted in a metal can. The pouch-shaped battery is a battery that is generally configured to have a structure in which an electrode assembly is mounted in a pouch-shaped battery case made of an aluminum laminate sheet. Among these batteries, the pouch-shaped battery, which can be stacked with high integration, has high energy density per unit weight, is inexpensive, and can be easily modified, has attracted considerable attention in recent years.

One of the principal research projects for a pouch-shaped battery, the outer surface of which is soft, is to increase the ratio of capacity to volume of the pouch-shaped battery while improving the safety of the pouch-shaped battery. A lithium secondary battery, which is constituted by an electrode assembly, may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperatures, or deformation of the secondary battery due to being dropped or having an external impact applied thereto.

Generally, in the case in which a silicon-based negative electrode active material is used as a negative electrode active material of a secondary battery, the change in the volume of the negative electrode active material is great and the amount of an electrolyte solution is rapidly reduced during charging and discharging of the secondary battery, whereby the cycle characteristics of the secondary battery are deteriorated, compared to the case in which a graphite-based negative electrode active material is used.

In addition, when a formation process for charging and discharging a battery cell in order to activate the battery cell is performed, the battery cell is severely deformed, since the change in the volume of the silicon-based negative electrode active material is great, whereby the defect rate of the battery cell is increased.

In connection therewith, Patent Document 1 discloses a method of manufacturing a secondary battery, wherein a charging and discharging process for setting the capacity grade of the battery and a shipment charging process are performed before a degassing process for removing gas from the battery cell. However, this patent document does not suggest detailed technology that is capable of increasing the rate at which an electrode assembly is impregnated with an electrolyte solution.

Patent Document 2 discloses a pressing clamp device used to prevent deformation of a battery cell during charging and discharging of the battery cell. However, this patent document does not disclose a method of reducing the amount of an electrolyte solution that is discharged in a process of degassing the battery cell.

Patent Document 3 discloses a method of manufacturing a battery cell including a process of pressing the outer surface of a battery case in order to induce tip pressure in an electrode assembly before a charging and discharging process for activating the battery cell in order to minimize a change in the thickness of the electrode assembly that may be caused in the activation process, thereby reducing resistance in the battery cell, and Patent Document 4 discloses a charging and discharging jig for charging and discharging a lithium polymer battery in the state in which an electrode of the lithium polymer battery is in tight contact with a current conduction member as the result of forcible support of a voltage measurement member.

However, Patent Documents 3 and 4 do not disclose a method of increasing the rate at which the electrode assembly is impregnated with an electrolyte solution.

Therefore, there is an urgent necessity for technology that is capable of increasing the rate at which an electrode assembly is impregnated with an electrolyte solution at the time of manufacturing a pouch-shaped secondary battery, thereby improving the lifespan characteristics of the battery, and that is capable of preventing deformation of a battery case, thereby reducing the defect rate of the battery.

(Patent Document 1) Korean Patent Application Publication No. 2017-0033601
(Patent Document 2) Japanese Patent Application Publication No. 2016-515291
(Patent Document 3) Korean Patent Application Publication No. 2016-0132572
(Patent Document 4) Korean Registered Patent No. 0987942

DISCLOSURE

Technical Problem

The present invention has been made in view of the above problems and other technical problems that have yet to be resolved, and it is an object of the present invention to provide a method of manufacturing a pouch-shaped battery cell that is capable of performing a primary formation step on a pouch-shaped battery cell having an electrolytic solution injected into, placing the pouch-shaped battery cell in a jig, and performing a jig grading step in order to manufacture the pouch-shaped battery cell, whereby it is possible to prevent the battery cell from being deformed in a formation process for charging and discharging the battery cell, to increase the rate at which an electrode assembly is impregnated with the electrolyte solution, to increase the capacity of the pouch-shaped battery cell, and to improve the lifespan characteristics of the pouch-shaped battery cell.

Technical Solution

In accordance with an aspect of the present invention, the above and other objects can be accomplished by the provision of a method of manufacturing a pouch-shaped battery cell, the method including injecting an electrolytic solution into a pouch-shaped battery case, in which an electrode assembly is mounted, a primary formation step including charging and discharging the pouch-shaped battery cell having the electrolytic solution injected thereinto (a primary formation step), placing the pouch-shaped battery cell in a jig configured to fix and press the pouch-shaped battery cell, and a jig grading step including charging and discharging the pouch-shaped battery cell while pressure is applied to the pouch-shaped battery cell by the jig.

That is, the method of manufacturing the pouch-shaped battery cell according to the present invention includes a process of charging and discharging a pouch-shaped battery cell having an electrolytic solution injected thereinto while applying pressure to the pouch-shaped battery cell in the state in which the pouch-shaped battery cell is fixed by a jig.

In general, at the time of charging and discharging the pouch-shaped battery cell, the battery case may swell or distort due to the expansion of the electrode assembly or the generation of gas in the pouch-shaped battery cell. In the case in which the pouch-shaped battery cell is charged and discharged in the state of being placed in the jig, as in the present invention, it is possible to prevent deformation of the battery cell and thus to prevent an increase in the defect rate due to deterioration in the external appearance of the battery cell.

Also, in the case of a high-capacity battery, an electrolytic solution is discharged from the battery during a degassing process, whereby the remaining amount of the electrolytic solution is reduced, which may reduce the lifespan of the battery. In the case in which the pouch-shaped battery cell is charged in the state of being placed in the jig, as in the present invention, the electrolytic solution is introduced into pores formed in the expanded electrode, whereby the amount of the electrolytic solution that is impregnated is increased, and therefore it is possible to reduce the amount of electrolytic solution that is discharged during a degassing process. Consequently, it is possible to solve a problem in which the cycle characteristics of the battery cell are deteriorated due to an insufficient remaining amount of the electrolytic solution.

In a concrete example, the electrode assembly may include a negative electrode including a silicon-based negative electrode active material. For example, the silicon-based negative electrode active material may be at least one selected from the group consisting of SiC, SiO, SiM, and a combination thereof, wherein M may include any one selected from the group consisting of Ni, Co, B, Cr, Cu, Fe, Mn, Ti, Y, and a combination thereof.

In general, carbon, lithium transition metal oxide, or a silicon-based compound may be used as a negative electrode active material of a secondary battery. In the case in which the silicon-based compound is used as the negative electrode active material, silicon particles may electrochemically adsorb, store, and discharge lithium atoms, whereby the crystalline structure of the silicon particles may be changed. As the silicon particles electrochemically adsorb, store, and discharge the lithium atoms, the composition and the crystalline structure of the silicon particles are changed into Si (crystalline structure: Fd3m), LiSi (crystalline structure: I41/a), $Li_2Si$ (crystalline structure: C2/m), $Li_7Si_2$ (Pbam), or $Li_{22}Si_5$ (F23). As the crystalline structure of the silicon particles are changed, as described above, the volume of the silicon particles becomes about 4 times as much as the volume of the silicon particles before lithium is introduced thereinto. As the number of pores formed among the expanded silicon particles is increased, the amount of the electrolytic solution that is impregnated is increased.

In the case in which a silicon-based compound including silicon is used as the negative electrode active material, as described above, the amount of the electrolytic solution that is impregnated may be increased. In the case in which the electrolytic solution is prevented from being easily discharged to the outside, therefore, it is possible to improve the lifespan characteristics of the battery cell.

The jig may be configured to have a structure capable of receiving a plurality of pouch-shaped battery cells. Specifically, the jig may be configured to have a structure in which a plurality of support members are provided in order to fix the pouch-shaped battery cells in the vertical direction such that electrode terminals of the pouch-shaped battery cells protrude upwards.

In a concrete example, the method may further include discharging gas from the battery cell after the jig grading step. The degassing process may be performed using a method of performing vacuum suctioning and applying pressure in order to remove gas generated from the battery cell at the jig grading step. Since the electrolytic solution as well as the gas is discharged to the outside, however, the degassing process must be carefully performed for a high-capacity battery that requires an excessive amount of electrolytic solution.

In the case in which the degassing step is performed after the jig grading step, gas is discharged from the battery cell after the remaining amount of the electrolytic solution in the expanded negative electrode active material is increased. Consequently, it is possible to reduce the amount of electrolytic solution that is discharged in the degassing process.

The electrolytic solution may be injected using a general injection method or a vacuum injection method. In the general injection method, a predetermined amount of electrolytic solution is injected into a pouch using a pipette in the state in which a battery cell is erected vertically, and then a wetting process is performed in a vacuum atmosphere for about 3 to 5 minutes.

The vacuum injection method is performed as follows.

A battery cell is placed in a vacuum injection chamber in the state in which plates are disposed at opposite surfaces of the battery cell, and then the interior of the chamber is maintained in a vacuum state for 1 minute in the state in which an electrolytic solution injection nozzle is inserted into the battery cell. A vacuum breakage valve is opened in order to adjust the degree of vacuum in the chamber to a desired level, and then an electrolytic solution injection valve is opened to inject an electrolytic solution into the battery cell. After the injection of the electrolytic solution, the vacuum breakage valve is opened in order to break the vacuum, while the surface of the electrolytic solution is maintained for about 1 to 5 minutes in order to improve wetting efficiency, and then the battery cell is removed from the chamber.

Consequently, it is preferable to use the vacuum injection method in order to achieve uniform efficiency in impregnating the electrode assembly with the electrolytic solution.

The method may further include aging the pouch-shaped battery cell before and after the primary formation step. This aging process may be a process for maintaining the state of the battery cell uniform or slowly changing the state of the battery cell in order to age the battery cell.

The aging process may include a normal-temperature aging process and a high-temperature aging process. The normal-temperature aging process may be performed at a temperature of 18° C. to 27° C., and the high-temperature aging process may be performed at a temperature of at least 50° C. to 70° C.

Specifically, the electrolytic solution is injected before the primary formation step. In order to sufficiently impregnate the electrode assembly with the electrolytic solution, the battery cell may be aged at a normal temperature for about 3 days. After the primary formation step, the battery cell may be aged at a normal temperature for about 1 day in order to stabilize the battery cell after the battery cell is charged and discharged.

In accordance with another aspect of the present invention, there is provided a pouch-shaped battery cell manufactured using the method of manufacturing the pouch-shaped battery cell.

A secondary battery according to the present invention may be a lithium secondary battery configured to have a structure in which an electrode assembly, in which a separator is interposed between a positive electrode and a negative electrode, is impregnated with a non-aqueous electrolytic solution containing lithium salt.

The positive electrode is manufactured, for example, by applying a positive electrode mixture including a positive electrode active material to a positive electrode current collector and drying the positive electrode mixture. The positive electrode mixture may further selectively include a binder, a conductive agent, and a filler as needed.

In general, the positive electrode current collector is generally manufactured so as to have a thickness of 3 to 500/m. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material, in the same manner as the negative electrode current collector. The positive electrode current collector may be configured in various forms, such as those of a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $-0.5 \leq x \leq 0.5$, $0 \leq y \leq 0.5$, and $0 \leq z \leq 0.1$).

The conductive agent is generally added so that the conductive agent accounts for 1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. There is no particular limit to the filler, as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

The negative electrode may be manufactured, for example, by applying a negative electrode mixture including a negative electrode active material to a negative electrode current collector and drying the negative electrode mixture. The negative electrode mixture may include the above-described components, such as a conductive agent, a binder, and a filler, as needed.

In general, the negative electrode current collector is manufactured so as to have a thickness of 3 to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

The negative electrode active material includes the above-described silicon-based compound. As the negative electrode active material, for example, there may be used carbon, such as a hard carbon or a graphite-based carbon; a metal composite oxide, such as $Li_xFe_2O_3$ ($0 \le x \le 1$), $Li_xWO_2$ ($0 \le x \le 1$), or $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le z \le 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The binder, the conductive agent, and other components added as needed are identical to those described in connection with the positive electrode.

Depending on the circumstances, a filler may be selectively added as a component used to inhibit expansion of the negative electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

In addition, other components, such as a viscosity-controlling agent and an adhesion promoter, may selectively be further included, either alone or as a combination of two or more components.

The viscosity-controlling agent is a component for controlling the viscosity of the electrode mixture so as to facilitate mixing of the electrode mixture and coating thereof on the current collector. The viscosity-controlling agent may be added in an amount of up to 30 weight % based on the total weight of the negative electrode mixture. Examples of the viscosity-controlling agent include, without being limited to, carboxymethylcellulose and polyvinylidene fluoride. However, the present invention is not limited thereto. Depending on the circumstances, the above-described solvent may also function as the viscosity-controlling agent.

The adhesion promoter is an auxiliary component that is added to improve adhesion between the electrode active material and the electrode current collector. The adhesion promoter may be added in an amount of 10 weight % or less based on the amount of the binder. Examples of the adhesion promoter include, without being limited to, oxalic acid, adipic acid, formic acid, acrylic acid derivatives, and itaconic acid derivatives.

The separator is interposed between the positive electrode and the negative electrode. As the separator, for example, an insulative thin film that exhibits high ion permeability and mechanical strength is used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The non-aqueous electrolytic solution containing lithium salt is composed of an electrolytic solution and lithium salt. A non-aqueous organic solvent, an organic solid electrolyte, or an inorganic solid electrolyte may be used as the electrolytic solution.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility thereto, the non-aqueous electrolytic solution may further include halogen-containing solvents, such as carbon tetrachloride and ethylene trifluoride. Furthermore, in order to improve high-temperature retention characteristics thereof, the non-aqueous electrolytic solution may further include carbon dioxide gas. Moreover, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high-dielectric solvent, and linear carbonate, such as DEC, DMC, or EMC, which is a low-viscosity solvent, in order to manufacture a non-aqueous electrolyte containing lithium salt.

The pouch-shaped battery cell is manufactured by performing a jig grading process in the state in which the pouch-shaped battery cell is fixed by the jig. Compared to a pouch-shaped battery cell that is not subjected to the above process, it is possible to manufacture a battery cell having a higher capacity. For example, the pouch-shaped battery cell may have a capacity of 3,400 mAh to 3,500 mAh. In the case in which the pouch-shaped battery cell is manufactured so as to have a design capacity of 3,426 mAh, it is possible to manufacture a pouch-shaped battery cell having the above-described range of capacity.

In addition, the remaining amount of the electrolytic solution in the pouch-shaped battery cell may range from 2.5 g/Ah to 3.0 g/Ah. In the case in which the jig is not used, the remaining amount of the electrolytic solution in the pouch-shaped battery cell is 1.6 g/Ah to 1.7 g/Ah. Consequently, it can be seen that, in the case in which the jig is used, as in the present invention, it is possible to provide a secondary battery impregnated with an increased amount of electrolytic solution and thus having improved lifespan characteristics.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 1:
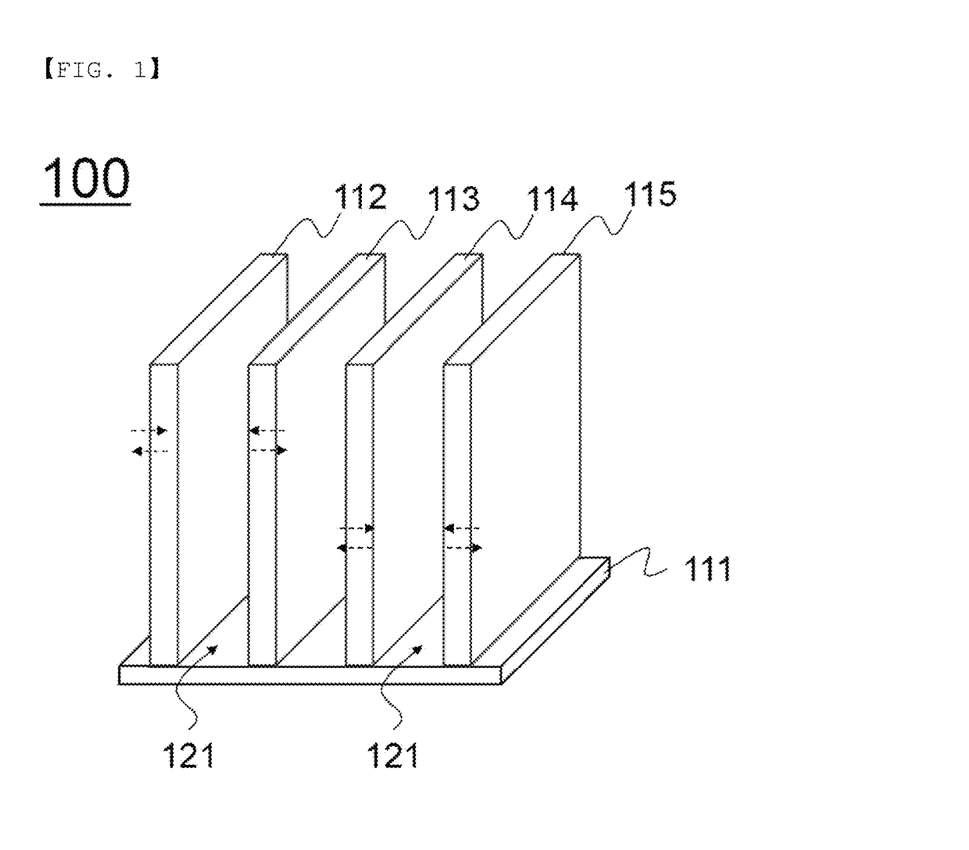
FIG. 1 is a perspective view showing a jig for fixing a pouch-shaped battery cell.

FIG. 1 is a perspective view schematically showing a jig for fixing a pouch-shaped battery cell according to the present invention.

Referring to FIG. 1, the jig, denoted by reference numeral 100, includes a flat type base 111, on the upper surface of which a pouch-shaped battery cell is located, support portions 112, 113, 114, and 115 fixed to the base 111 so as to extend perpendicularly from the base 111 for fixing a pouch-shaped battery cell, and pouch-shaped battery cell reception portions 121.

The jig 100 is configured to have a structure including four support portions 112, 113, 114, and 115. The support portion 112 and the support portion 113 make a pair, and the support portion 114 and the support portion 115 make another pair. Each of the support portions 112 and 113 and the support portions 114 and 115 move toward each other to press a battery cell located in a corresponding one of the battery cell reception portions 121. In order to remove a battery cell that has undergone a pressing process and a formation process, each of the support portions 112 and 113 and the support portions 114 and 115 move away from each other.

In FIG. 1, the jig 100 is illustrated as including four support portions. However, the number of support portions of a jig used in a manufacturing method according to the present invention is not particularly restricted. A jig configured to have a structure in which two or more support portions are provided in order to press a battery cell located therebetween may fall within the scope of the present invention.

Figure 2:
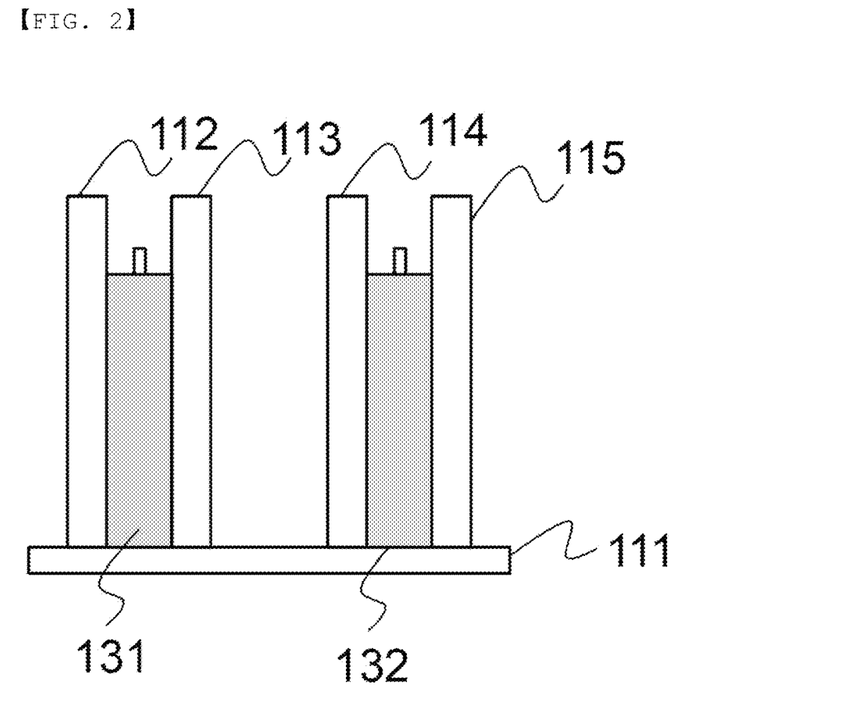
FIG. 2 is a front view showing the state in which pouch-shaped battery cells are fixed by the jig of FIG. 1.

FIG. 2 is a front view schematically showing the state in which pouch-shaped battery cells are fixed by the jig of FIG. 1.

Referring to FIG. 2, a pouch-shaped battery cell 131 is fixed between the support portion 112 and the support portion 113, and another pouch-shaped battery cell 132 is fixed between the support portion 114 and the support portion 115.

The height of each of the support portions 112, 113, 114, and 115 is greater than the height of a corresponding one of the pouch-shaped battery cells 131 and 132. As shown in the figure, the support portions 112, 113, 114, and 115 are configured to press two battery cells. Alternatively, the jig may be configured to have a structure including a plurality of support portions and a plurality of battery cell reception portions in order to press one battery cell or to simultaneously press two or more battery cells.

Each of the battery cells 131 and 132 is fixed in a corresponding one of the battery cell reception portions 121 in the state of being erected in the vertical direction such that electrode terminals thereof protrude upwards. Alternatively, the electrode terminals may protrude laterally from the battery cell, as long as the battery cell is erected in the vertical direction.

In the case in which the magnitude of pressure that is applied to battery cells is set in the state in which the battery cells are located in the jig 100, the support portions move toward each other to press the battery cells. In this state, the battery cells are charged and discharged.

Hereinafter, the present invention will be described with reference to the following examples. These examples are provided only for illustration of the present invention and should not be construed as limiting the scope of the present invention.

Example 1

An electrode assembly, configured to have a structure in which a positive electrode including lithium cobalt oxide, as a positive electrode active material, and a negative electrode including silicon oxide, as a negative electrode active material, were stacked in the state in which a separator was interposed between the positive electrode and the negative electrode, was placed in a pouch-shaped battery case, and then 11 g of an electrolytic solution was injected into the battery case in a vacuum state in order to manufacture a pouch-shaped battery cell.

The pouch-shaped battery cell was aged at a normal temperature for 3 days, and then the battery cell was fixed by a jig including a battery cell reception portion in order to perform a primary formation process. The battery cell was discharged at a discharge rate of 0.1 C so as to have a state of charge (SOC) of 17% while the battery cell was pressed at a pressure of 0.5 kgf/cm$^2$, and was then charged at a charge rate of 0.2 C so as to have an SOC of 65% while the battery cell was pressed at a pressure of 3.4 kgf/cm$^2$.

Subsequently, the battery cell was aged at a normal temperature for 1 day, and then the battery cell was fixed by the jig in order to perform a jig grading process. The battery cell was fully charged at a charge rate of 0.2 C so as to have an SOC of 55% while the battery cell was pressed at a pressure of 0.5 kgf/cm$^2$, and was then fully discharged at a discharge rate of 0.2 C so as to have an SOC of 55% while the battery cell was pressed at a pressure of 0.5 kgf/cm². The full charging process and the full discharging process were repeated.

The battery cell was removed from the jig, and then the capacity of the battery cell and the remaining amount of the electrolytic solution were measured. The results are shown in Table 1.

Example 2

A battery cell was manufactured in the same manner as in Example 1 except that, in the jig grading process, the battery cell was pressed at a pressure of 2 kgf/cm² in the state in which the battery cell was fixed by the jig.

The manufactured battery cell was removed from the jig, and then the capacity of the battery cell and the remaining amount of the electrolytic solution were measured. The results are shown in Table 1.

Comparative Example 1

A battery cell was manufactured in the same manner as in Example 1 except that no jig grading process was performed.

The manufactured battery cell was removed from the jig, and then the capacity of the battery cell and the remaining amount of the electrolytic solution were measured. The results are shown in Table 1.

Comparative Example 2

A battery cell was manufactured in the same manner as in Example 1 except that no jig grading process was performed and the electrolytic solution was injected using a general injection method.

The manufactured battery cell was removed from the jig, and then the capacity of the battery cell and the remaining amount of the electrolytic solution were measured. The results are shown in Table 1.

TABLE 1

|   | Capacity of battery cell (0.2 C, mAh) | Remaining amount of electrolytic solution (g) |
|---|---|---|
| Example 1 | 3,438.2 ± 6.3 | 10.30 |
| Example 2 | 3,410.0 ± 5.3 | 10.25 |
| Comparative Example 1 | 3,310.4 ± 9.9 | 5.53 |
| Comparative Example 2 | 3,280.0 ± 16.0 | 5.20 |

Referring to Table 1 above, the capacities of the battery cells manufactured according to Examples 1 and 2 measured after the jig grading process was performed were 3,438.2±6.3 mAh and 3,410.0±5.3 mAh, respectively. The capacities of the battery cells manufactured according to Examples 1 and 2 were at least about 100 mAh greater than the capacities of the battery cells manufactured according to Comparative Examples 1 and 2.

In addition, when comparing the remaining amount of the electrolytic solution, the remaining amount of the electrolytic solution in each of the battery cells manufactured according to Examples 1 and 2 was 10 g or more, whereas the remaining amount of the electrolytic solution in each of the battery cells manufactured according to Comparative Examples 1 and 2 was about 5 g. That is, the remaining amount of the electrolytic solution in each of the battery cells manufactured according to Examples 1 and 2 was increased by about 100% from the remaining amount of the electrolytic solution in each of the battery cells manufactured according to Comparative Examples 1 and 2.

Figure 3:
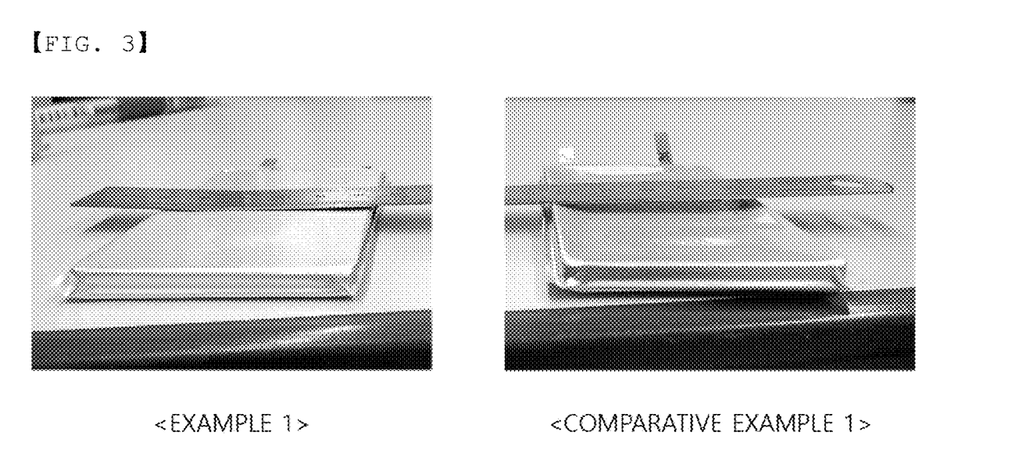
FIG. 3 is a photograph showing the deformation of pouch-shaped battery cells manufactured according to Example 1 and Comparative Example 1.

Meanwhile, FIG. 3 is a photograph showing the pouch-shaped battery cells manufactured according to Example 1 and Comparative Example 1. The battery cell manufactured according to Example 1 was slightly deformed, whereas the middle portion of the battery cell manufactured according to Comparative Example 1 was concave.

In the case in which the battery cell is charged and discharged using the jig according to the manufacturing method of the present invention, therefore, the battery cell is little deformed, the capacity of the battery cell is increased, and the amount of the electrolytic solution remaining in the battery cell is increased. Consequently, it is possible to provide a battery cell having improved lifespan characteristics.

Those skilled in the art to which the present invention pertains will appreciate that various applications and modifications are possible based on the above description, without departing from the scope of the present invention.

100: Jig
111: Base of jig
112, 113, 114, 115: Support portions of jig
121: Battery cell reception portions of jig
131, 132: Pouch-shaped battery cells

INDUSTRIAL APPLICABILITY

As is apparent from the above description, in a method of manufacturing a pouch-shaped battery cell according to the present invention, a pouch-shaped battery cell undergoes a primary formation step for primarily charging and discharging the pouch-shaped battery cell in the state in which an electrolytic solution is injected into the pouch-shaped battery cell, and then jig grading is performed in order to secondarily charge and discharge the pouch-shaped battery cell in the state in which the pouch-shaped battery cell is fixed by a jig. At this time, the battery cell is pressed by the jig. Consequently, it is possible to prevent the battery cell from being deformed due to expansion of an electrode assembly during charging and discharging of the battery cell.

In addition, since the battery cell is charged in the state of being fixed by the jig, the amount of the electrolytic solution that is introduced into pores formed in an expanded negative electrode is increased. As a result, the amount of the electrolytic solution that is discharged in a degassing process is reduced, whereby it is possible to improve the lifespan characteristics of the battery cell.

The invention claimed is:

1. A method of manufacturing a pouch-shaped battery cell, the method comprising:
    injecting an electrolytic solution into a pouch-shaped battery case, in which an electrode assembly is mounted;
    a primary formation step including charging and discharging the pouch-shaped battery cell having the electrolytic solution injected thereinto;
    placing the pouch-shaped battery cell in a jig configured to fix and press the pouch-shaped battery cell; and
    a jig grading step including charging and discharging the pouch-shaped battery cell while pressure is applied to the pouch-shaped battery cell by the jig,
    wherein the jig has a plurality of pairs of support portions extending from a base, and wherein placing the pouch-shaped battery cell in the jig comprises placing the pouch-shaped battery cell between a first pair of the plurality of pairs of support portions and applying pressure by moving each of the support portions of the first pair in opposite directions and toward one another.

2. The method according to claim 1, wherein the electrode assembly comprises a negative electrode comprising a silicon-based negative electrode active material.

3. The method according to claim 2, wherein the silicon-based negative electrode active material is at least one selected from a group consisting of SiC, SiO, SiM, and a combination thereof, and
wherein M comprises any one selected from a group consisting of Ni, Co, B, Cr, Cu, Fe, Mn, Ti, Y, and a combination thereof.

4. The method according to claim 1, wherein the electrolytic solution is injected using a vacuum injection method.

5. The method according to claim 1, further comprising aging the pouch-shaped battery cell before and after the primary formation step.

6. A pouch-shaped battery cell manufactured using a method of manufacturing a pouch-shaped battery cell according to claim 1.

7. The pouch-shaped battery cell according to claim 6, wherein the pouch-shaped battery cell has a capacity of 3,400 mAh to 3,500 mAh.

8. The pouch-shaped battery cell according to claim 6, wherein a remaining amount of an electrolytic solution in the pouch-shaped battery cell ranges from 2.5 g/Ah to 3.0 g/Ah or more.

9. The pouch-shaped battery cell according to claim 6, wherein placing the pouch-shaped battery cell in the jig further comprises placing a plurality of pouch-shaped battery cells between a respective one of the plurality of pairs of support portions.

10. A method of manufacturing a pouch-shaped battery cell, the method comprising:
injecting an electrolytic solution into a pouch-shaped battery case, in which an electrode assembly is mounted;
a primary formation step including charging and discharging the pouch-shaped battery cell having the electrolytic solution injected thereinto;
placing the pouch-shaped battery cell in a jig configured to fix and press the pouch-shaped battery cell;
a jig grading step including charging and discharging the pouch-shaped battery cell while pressure is applied to the pouch-shaped battery cell by the jig; and
discharging gas from the battery cell after the jig grading step.

* * * * *